United States Patent

Goodrich

[15] 3,688,040

[45] Aug. 29, 1972

[54] TRANSMITTER CUT-OFF

[72] Inventor: Robert S. Goodrich, 27901 S. Golden Meadow Drive, Palos Verdes Peninsula, Calif. 90274

[22] Filed: Dec. 17, 1970

[21] Appl. No.: 98,984

Related U.S. Application Data

[63] Continuation-in-part of Ser. No. 64,308, Aug. 17, 1970.

[52] U.S. Cl. ....................179/167
[51] Int. Cl. ....................H04m 1/19
[58] Field of Search....................179/158, 167

[56] References Cited

UNITED STATES PATENTS

| | | | |
|---|---|---|---|
| 2,838,615 | 6/1958 | Leifer | 179/158 |
| 2,403,498 | 7/1946 | Brittingham | 179/158 |
| 3,588,387 | 6/1971 | Smith | 179/167 |

*Primary Examiner*—William C. Cooper
*Attorney*—Sokolski & Wohlgemuth

[57] ABSTRACT

A telephone cut off device for a telephone transmitter which is an insert disposed between the mouthpiece of the transmitter and the main transmitter housing. The device has contacts on one side thereof for engaging the contacts in the transmitter housing, the contacts extending through the device to engage the corresponding terminals on a transmitter capsule unit in the mouthpiece. A depressible means for moving one of the contacts in the device is provided to break the contact between a corresponding spring contact in the transmitter housing and corresponding terminal in the capsule unit.

7 Claims, 4 Drawing Figures

INVENTOR
ROBERT S. GOODRICH
BY
SOKOLSKI & WOHLGEMUTH
ATTORNEYS

TRANSMITTER CUT-OFF

REFERENCE TO RELATED APPLICATION

This is a continuation-in-part of application, Ser. No. 64,308 filed Aug. 17, 1970.

It is often desirable to be able to cut off the transmitter unit of a telephone so that conversations can be held without the information being passed on to a conversant on the opposite end of the telephone line. The need for such units has been recognized in the past. For example such a device as disclosed in U.S. Pat. No. 2,838,615 wherein a separate cut out unit is inserted between the internally threaded mouthpiece containing the transmitter capsule unit and the transmitter housing. In this patent, the cut out device so inserted has terminals adapted to engage with the spring contacts in the transmitter housing and the terminals on the transmitter capsule located on the opposite side of the device from the spring contacts. Spring mounted depressible arcuate strips were provided on the outside of the device which served when depressed to bridge the contact means in the cut off device serving to short circuit them and render the transmitter unit ineffective. In other words, the device in this patent utilized a depressible switch to provide a short circuiting by providing a metal contact or bridge between the two terminals in the transmitter. The device required a plurality of pins which were spring mounted to achieve the desired short circuiting and thus was of a relatively complex and costly construction. Any deformation or misalignment of the spring mounted pins would prevent the desired short circuiting and thus it was required to have a plurality of them to assure that at least one of the pins would achieve the desired short circuiting. Other cut off devices have required rotation of a portion of the mouthpiece or have been of complex and expensive construction. Further, some of the prior devices have severely interfered with and could deleteriously effect the operation of the telephone unit.

Thus an object of this invention is to provide a telephone cut off device which is of simple construction.

Another object of this invention is to provide a telephone cut off device which cannot deleteriously effect the operation of the telephone.

Another object of this invention is to provide a telephone cut off device which has assured operation for achieving its desired purpose.

The above and other objects of this invention are accomplished by a cut off device which is an insert to be disposed between the mouthpiece and the main transmitter housing of the telephone. The insert is provided with a means such that it can be adjustably disposed on the transmitter housing while on opposite side having threads for readily engaging the mouthpiece of the unit. The insert device has two electrical contacts. A center contact extends therethrough and maintains an electrical connection between a center spring contact member of the phone and the corresponding contact in the transmitter capsule unit which is disposed on the opposite side of the cut off device. Additionally, the cut off device has a second contact extending therethrough which serves to maintain an electrical connection between an outer contact in the transmitter housing and a circumferential ring contact on the capsule. A depressible button or the like is mounted externally of the cut off body, such that when it is depressed inwardly toward the body, it serves to move the outer contact of the cut off device, breaking electrical connection between the outer contact in the transmitter housing and the ring contact on the transmitter capsule. The telephone user will hear a click when this contact is broken indicating that the cut off device is actuated. It is believed that the invention will be better understood from the following detailed description and drawings.

Figures 1, 2, 3, 4:
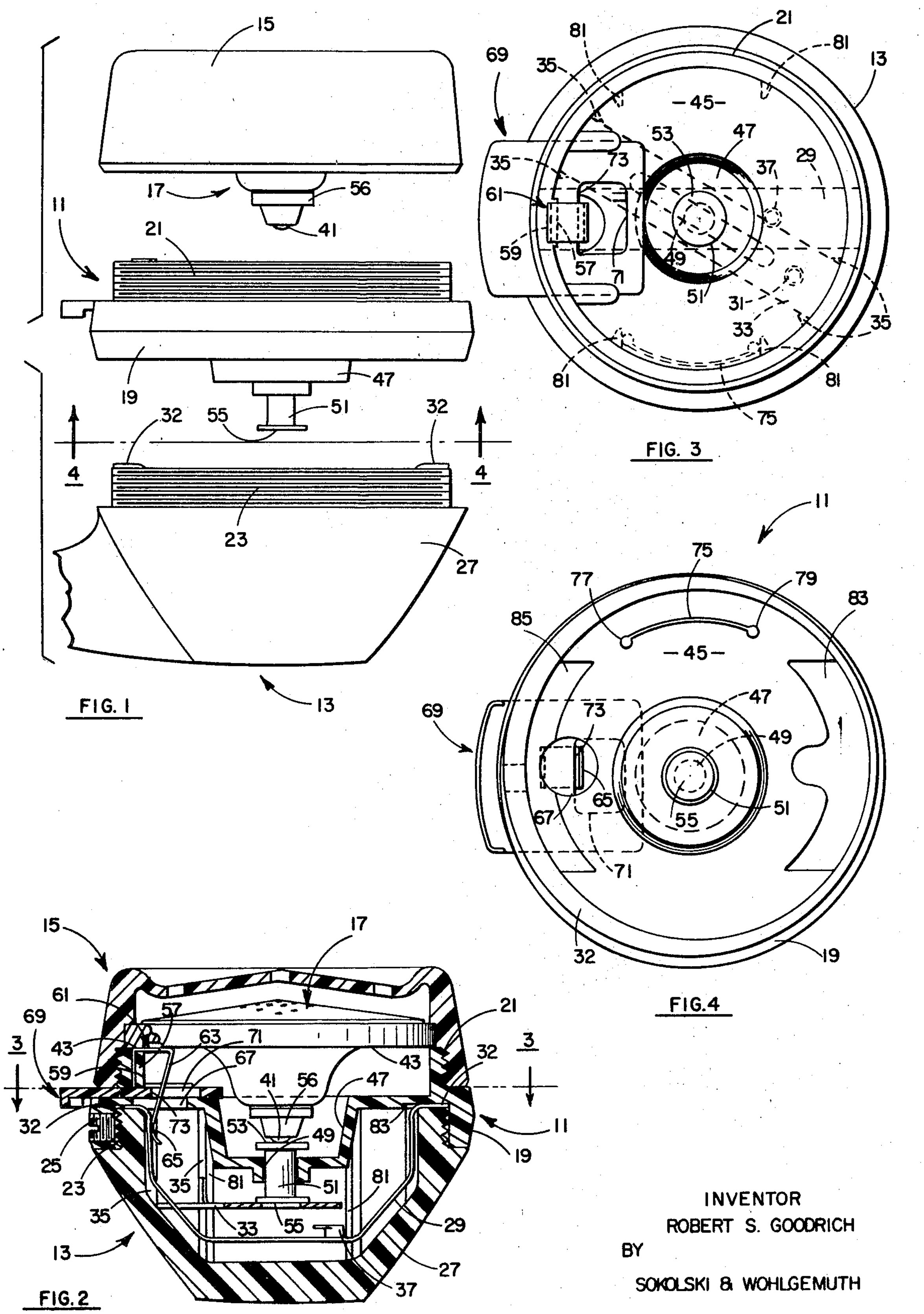
FIG. 1 is an exploded view of a portion of the handset including the cut off device of the invention.
FIG. 2 is a cross-section plan view of a telephone handset having the device of the herein invention inserted therein.
FIG. 3 is a cross-sectional view taken along line 3—3 of FIG. 1.
FIG. 4 is a cross-sectional view taken along 4—4 of FIG. 1.

Turning now to the figures. There is seen in FIG. 1 an exploded view of the transmitting portion of a telephone handset having a cut off device 11 of the invention disposed between a handset portion 13 and normal mouthpiece element 15 having a capsule unit 17 therein. The device 11 of the invention has an outer wall portion 19 which corresponds generally to the diameter of the mouthpiece 13. Integrally formed as an extension from one side of the wall portion 19 is an externally threaded cylindrical ring portion 21 which threadably engages the mouthpiece element 15 as will be further seen in FIG. 2. In a preferred embodiment of this invention the inner diameter of the wall portion 19 is not in threaded engagement with threads 23 on the handset 13, since it is desirable to position the unit in one of two positions according to the particular user, as will be further explained. Thus the device 11 can be affixed to the transmitter unit by at least one set screw 25, seen in FIG. 2, which passes through the wall 19 to engage the threads 23. Though one set screw is shown at 25, it should be understood that a plurality can be used.

In order to understand the operation of the device 11 of this invention, attention is first directed to FIGS. 2–4 for an explanation of the construction of the phone in which the device is to be used. In the particular phone shown, the handset 13 has a transmitter housing 27 which contains a first contact 29 which is a generally U-shaped metal member extending across the diameter of the housing 29, following the contour or outline of the housing. A terminal 31 is provided to connect a lead thereto. The outer ends 32 of the contact 29 overlap the exposed edge of the housing 27 adjacent the threaded area 23. Thus, in effect, two contact points 32 are provided on the circumference of the housing 27.

Additionally disposed within the housing 27 is a second contact 33 which is a flat metal bar secured in place between vertical ribs 35 disposed about the inner circumference of the housing 27. A terminal 37 is provided on the contact 33 to connect an electrical lead thereto. The contact 33 will hereinafter be referred to as the center contact. It should be pointed out that the aforegoing arrangement of the contacts 29 and 33 and their particular configuration within the transmitter 27 is a conventional design and represents one version of a widely available telephone unit. It is because of this particular arrangement that the version of the phone cut off device recited herein has been designed and fabricated in accord with the description that follows.

Disposed within the mouthpiece portion 15 of the telephone unit is a separate transmitter capsule 17. In the normal operation of the phone, without the cut off device 11 of this invention present, the capsule unit 17 has a center contact 41 which in turn touches the center contact 33 in the transmitter housing. Additionally, the capsule 17 has a circumferential metal contact 43 extending adjacent its periphery on the underside of the capsule toward the center contact 41. The circumferential contact portion 43 of the capsule is normally in contact with outer contact portions 32 of the first contact 29, thus providing a closed circuit to the capsule 17.

Turning now to the cut off device 11 of this invention, which may preferably be formed out of a single molded piece of plastic except for the metal contacts required, it is seen to be comprised of outer circumferential wall portion 19 which has an inner diameter sufficient to surround the threaded portion 23 of the transmitter housing 27 and held relative thereto by means of set screw 25 as previously described. Extending between the outer wall 19 is a transverse section 45. Extending normally from the transfer section 45 in a direction opposite from the circumferential wall 19 is a threaded circular portion 21 which engages the mouthpiece 15 then the cut off device 11 is installed.

The transverse section 45 has a center disk-shaped recess 47 extending downwardly therefrom in the direction of the circumferential wall 19. Recess portion 47 has a center aperture 49 therein in which is installed a slidable metal contact button 51 having opposed flat surfaces 53 and 55. The disk-shaped recess portion 47 is so designed as to accommodate the downwardly extending portion 56 of the capsule 17 and particularly the contact portion 41 thereof, allowing the cut off unit 11 to be extremely compact.

As seen in FIG. 2, when the unit 11 is installed, the surface 53 of the contact button 51 touches the center contact 41 of the capsule 39 while the opposite flat surface 55 of the button 51 contacts the center contact 33 in the transmitter housing 27 thus bridging the gap created between the capsule unit and the transmitter due to the utilization of the cut off device 11. By utilizing a slidable button 51, slight variances in the tolerances can be now tolerated, particularly since the center contact 33 in the transmitter housing is a spring-like element due to its suspension across the diameter of the transmitter housing as seen in FIG. 3 and as previously described.

Adjacent a portion of the inner diameter of the threaded extension portion 21 of the insert, there is a wall 57 integrally formed with the surface 45. The wall 57 is spatially disposed from the threaded diameter portion 21, such that a portion 59 of a spring contact element 61 can be inserted between the wall 57 and the threaded circumferential portion 21 as particularly seen in FIG. 2. In other words, the wall 57 together with the outer circumferential portion 21 forms an enclosure in which portion 59 of spring 61 is inserted. Spring 61 is additionally formed with a downwardly extending arm 63. The arm portion 63 is pre-formed to extend angularly toward the outer circumference of the device such that when the device 11 is installed the end 65 of the spring contact 61 touches the surface of the outer contact 29 in the transmitter unit. The downward extending portion 63 passes through an opening 67 in the surface 45 in order for it to reach the outer contact 29.

In the wall 21 adjacent the spring contact 61 there is provided an opening in which is mounted a slidable flat button element 69 which extends into the unit 11. The flat button 69 has an opening 71 therein which surrounds the portion 63 of the spring contact. When the button is forced inwardly, a surface 73 of the button 69 will contact the portion 63 forcing it inwardly to break the contact between end 65 and the outer contact 29. This serves as a means for operating the device and breaking the circuit involved so as to prevent the voice of the speaker from being transmitted. Upon release of the depressed button, the force of spring 63 will eject it outwardly from the phone and electrical connection between the end 65 and the outer contact 29 within the transmitter unit will be again established.

It is apparent that it is important that the unit 11 be positioned so that the end 65 of the spring contact 61 will maintain its relationship with the outer contact 29 of the transmitter housing. Thus, due to the configuration as seen in FIG. 2, the unit 11 can be mounted in one or two positions, depending on which side of the outer contact 29 it is to be contacted. To achieve proper alignment there is formed as an extension from the bottom of the surface 45, a curved wall 75 which terminates at ends 77 and 79 respectively. This curved wall 75 fits between two posts 81 formed on the inside of the transmitter housing as can be seen in FIG. 3. In order to accommodate for the surfaces 32 of the outer contact 29 that are exposed on the top surface of the transmitter housing, recesses 83 and 85 respectively are formed on the bottom of surface 45.

I claim:

1. A device for cutting off voice transmission in a telephone transmitter having a handset housing containing a first center contact and at least one second outer contact, and a separate capsule unit having corresponding contacts for engagement with the first and second contacts, said device comprising:

a housing of an insulative material having means for engaging said transmitter, separating the first and second contacts from the capsule unit, a first center conductor in said housing for providing an electrical connection between the center contact and the corresponding contact on the capsule unit, a second outer spring conductor having one end thereof secured to said housing and positioned to maintain an electrical connection with a corresponding contact on said capsule unit, the opposite end of said second conductor maintaining spring contact with the second outer contact of said handset housing, and switch actuator means in said housing extending externally thereof, a portion of said switch actuator means engageable with said spring conductor, whereby upon actuation of said switch actuator electrical contact can be broken between said spring contact and the second conductor.

2. The device of claim 1 wherein said housing of said device has a generally cylindrical outer wall and a transverse section within the wall.

3. The device of claim 2 wherein said transverse section has a receptacle portion formed concentrically therein to receive a portion of said capsule unit.

4. The device of claim 3 wherein the first center conductor is a slidable element disposed in the center of said receptacle portion.

5. The device of claim 2 further comprising:

means disposed on said transverse section for alignment of said device relative to said transmitter to assure connection between said second outer spring conductor and said second contact.

6. The device of claim 2 further comprising:

an externally threaded ring portion extending said wall portion oppositely from the depression formed in said transverse section and means formed on an inner surface of said wall portion to secure one end of said spring contact thereto.

7. The device of claim 6 further comprising:

an aperture formed in said transverse section adjacent said means for securing said spring contact, whereby a portion of said spring contact can extend and engage said second outer contact.

* * * * *